United States Patent [19]

Miller

[11] 3,976,839

[45] Aug. 24, 1976

[54] TELEPHONE PRIVACY SYSTEM

[75] Inventor: Ralph L. Miller, Chatham, N.J.

[73] Assignee: Bell Telephone Laboratories, Incorporated, Murray Hill, N.J.

[22] Filed: June 30, 1944

[21] Appl. No.: 542,974

[52] U.S. Cl. .............................. 179/1.5 M; 178/22; 179/1.5 R; 179/15 A; 179/15 BP

[51] Int. Cl.² ............................................ H04L 9/02

[58] Field of Search .............. 179/1.5, 1.5 R, 1.5 M, 179/15 BS, 15 BP, 15 A; 178/22

[56] References Cited

UNITED STATES PATENTS

| | | | |
|---|---|---|---|
| 2,366,583 | 1/1945 | Williams | 179/15 BS |
| 2,429,608 | 10/1947 | Chatterjea et al. | 179/15 BS |

*Primary Examiner*—Howard A. Birmiel
*Attorney, Agent, or Firm*—H. A. Burgess

EXEMPLARY CLAIM

1. In combination, means for receiving a signal wave accompanied by a pilot impulse, means to combine with the received signal wave a locally produced wave in predetermined phase relation comprising means to produce a local pilot impulse in definite relation to said locally produced wave, signal storage means, means responsive to said first pilot impulse to enable said storage means to receive and store said signal wave, a signal responsive device, and means controlled by said local impulse to impress said stored signal wave upon said signal responsive device together with said locally produced wave.

8. In a speech transmission system, means to sample input speech waves twice per cycle of the highest component frequency of the speech to be sent, means to produce pulses representative of the sampled speech equal in length to the time between sampling instants, means to combine said pulses with individual key pulses to disguise the speech pulses and means to transmit the combined pulses.

16 Claims, 6 Drawing Figures

Figure 1:
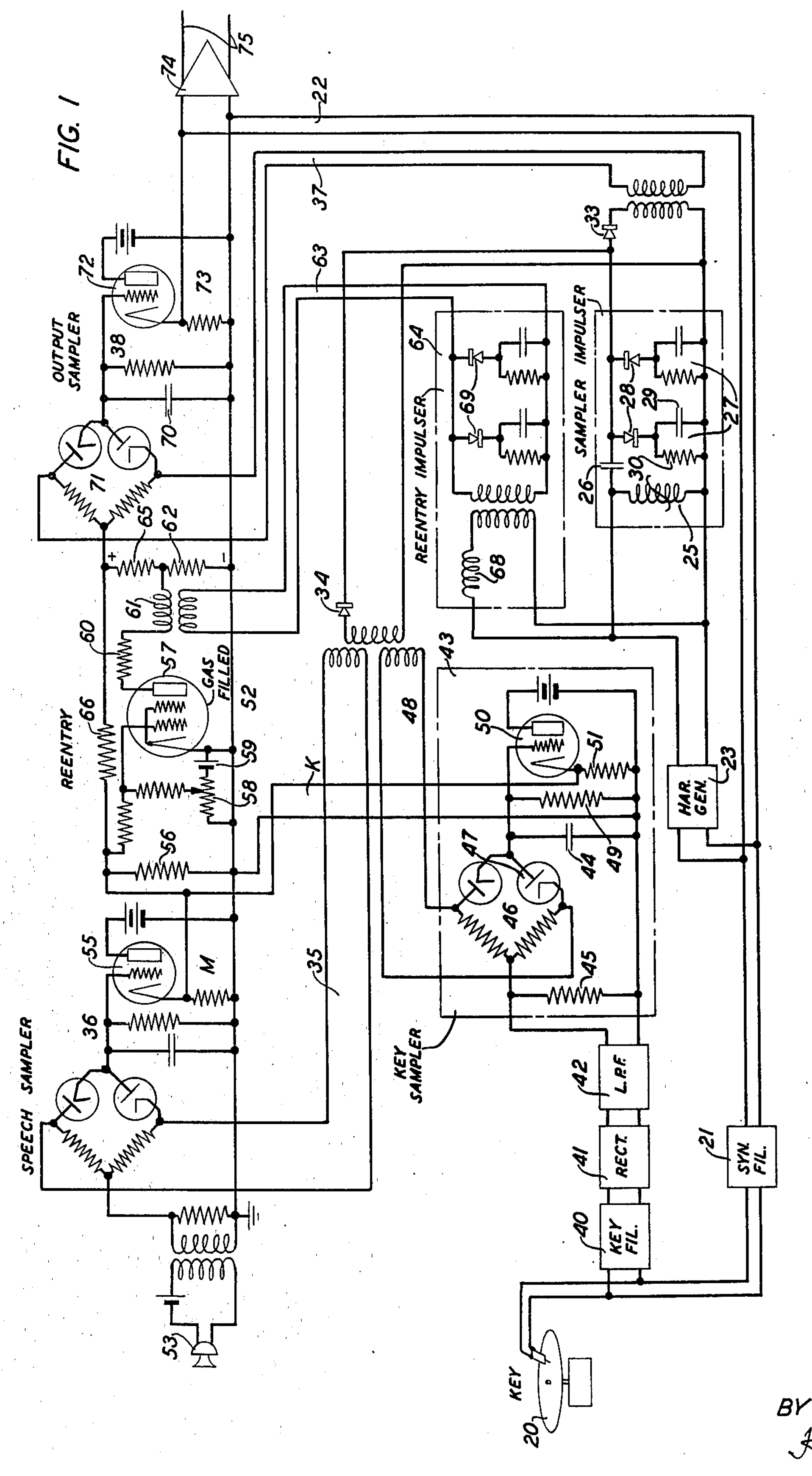

INVENTOR
R. L. MILLER
BY H. A. Burgess
ATTORNEY

INVENTOR
R. L. MILLER
BY H. A. Burgess
ATTORNEY

INVENTOR
R. L. MILLER
BY H. A. Burgess
ATTORNEY

TELEPHONE PRIVACY SYSTEM

The present invention relates to the transmission of intelligence where the intelligence-conveying waves are to be combined with locally supplied waves in definite timed relation. One such type of system to be disclosed herein for illustration is a secrecy system for transmitting speech or other signal waves with the aid of key waves which are supplied in duplicate at the transmitting and receiving stations and which are combined with the signals before transmission to conceal their identity and are also combined with the received waves at the receiver in such manner as to decode or recover the intelligence.

An object of the invention is to combine received waves and locally produced waves in predetermined and accurate time relation with the aid of pilot or timing impulses.

A further object of the invention is to achieve secrecy in signal transmission with simplification of terminal apparatus.

A further object of the invention is to simulate exact synchronism between distantly separated wave sources by controllably delaying application of the received waves at the receiver to cause them to coincide with locally produced waves.

Further objects of the invention and its various features will appear more fully from the following detailed description of an illustrative embodiment in the form of a secret telephone system as shown in the accompanying drawings.

Figure 5:
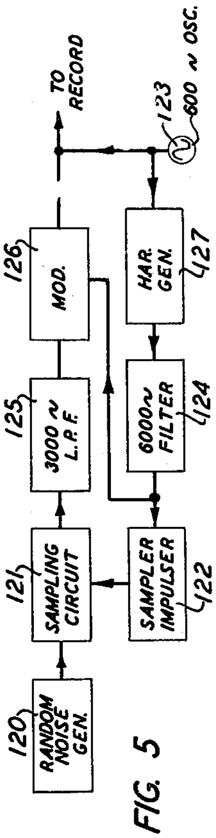
Figure 2:
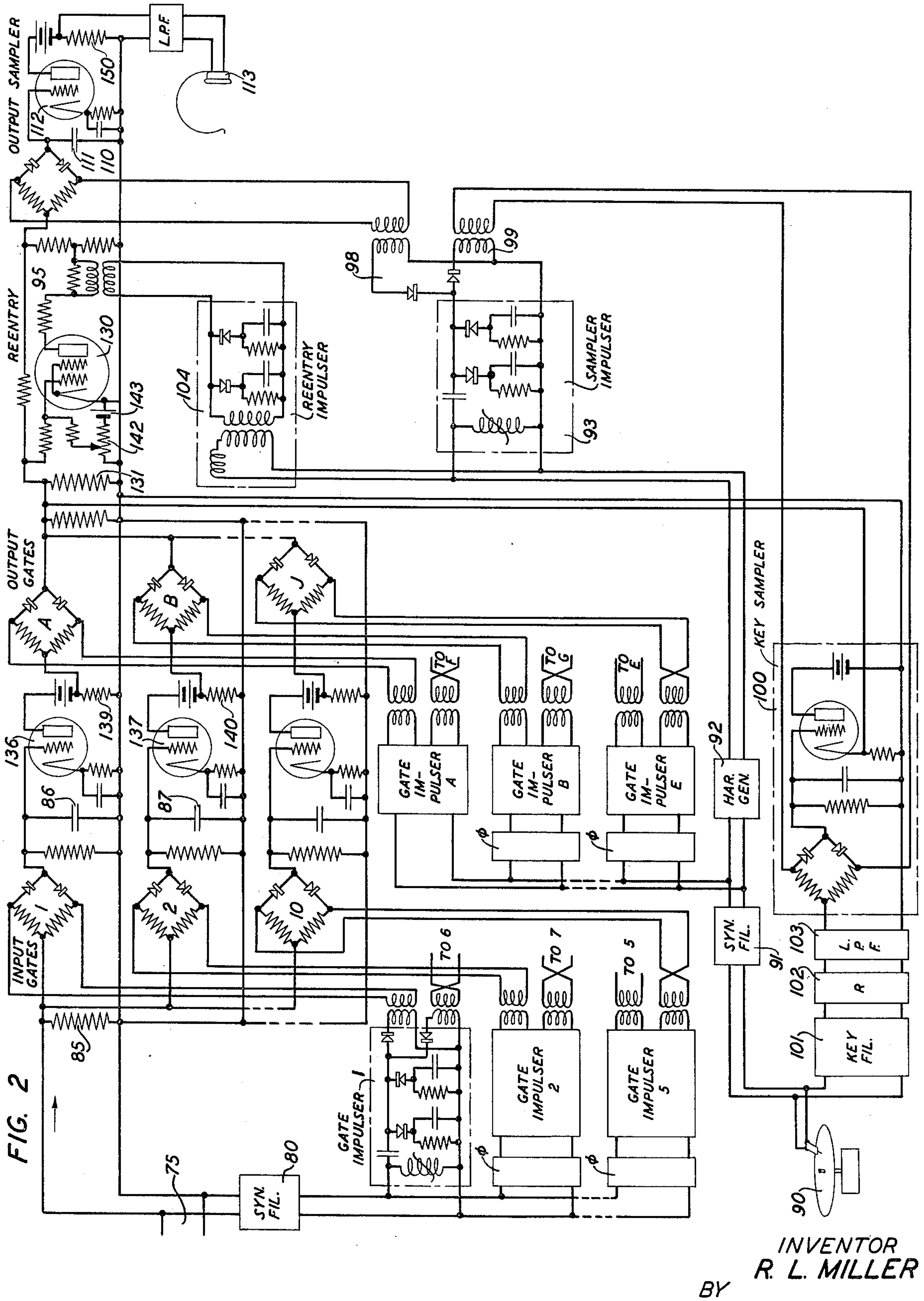
Figure 3:
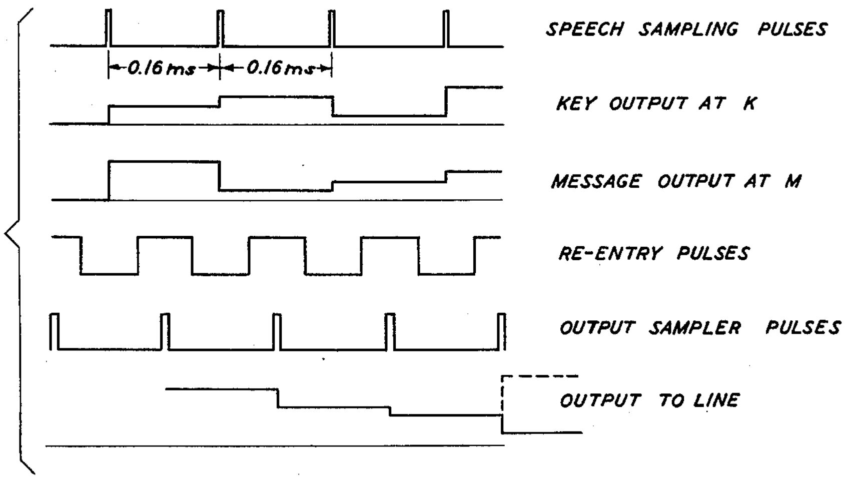
Figure 4:
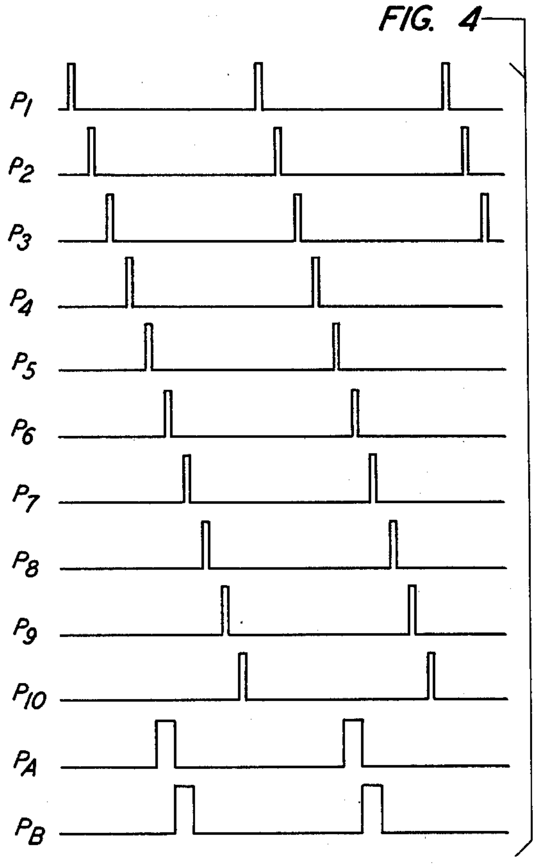
Figure 6:
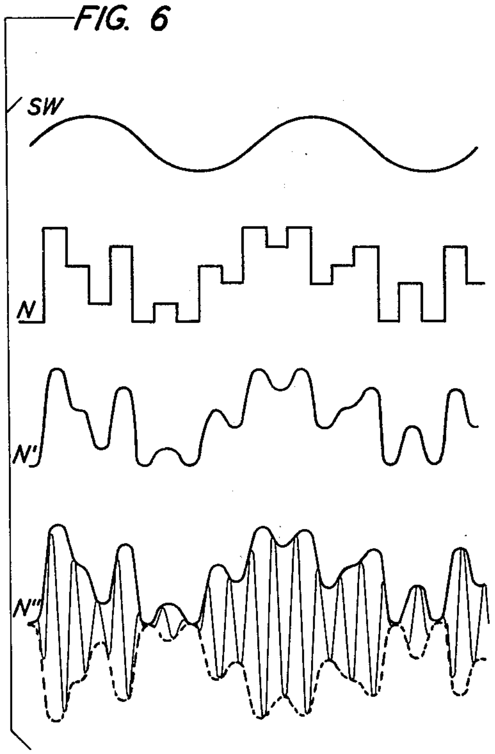

In the drawings,

FIGS. 1 and 2 when placed together, with FIG. 1 at the left, show a complete one-way system of speech transmission with privacy according to the invention, FIG. 1 showing the circuit at the transmitting station and FIG. 2 showing that at the receiving station;

FIGS. 3, 4 and 6 show graphs of pulses or wave shapes to be referred to in the description; and FIG. 5 is a block schematic diagram of a circuit for preparing the key records used with the system shown in FIGS. 1 and 2.

Secrecy systems are known in which speech is analyzed into low frequency component waves which are disguised by combining key waves with them before transmission and which are recovered at the receiver by use of duplicate key waves. One advantage of using low frequency component waves as a basis for application of the key currents is that the problem of synchronizing the keying operations at the different stations is much easier than if the speech wave itself were to be directly coded and uncoded by means of duplicate keys. In such known systems, for example, the component waves can be sent in the form of pulses of about 1/50th second duration and varying in amplitude from pulse to pulse. Since the intelligence is carried entirely by the amplitude of these reasonably flat-topped pulses, they can be sampled at either the exact center of the pulse or over a considerable range of times on either side of the exact center with similar results so that a certain tolerance exists in the synchronism between the received pulses and the locally produced pulses to be combined therewith, which are also flat-topped pulses and are sampled at the same instants as the received pulses under control of the local timing circuit.

If the speech wave itself were to be directly coded and if it were sampled at 6,000 cycles per second, or at some comparable frequency, as would be necessary to secure reasonably good intelligibility in transmission, the synchronizing problem would be about 120 times as difficult, since each pulse instead of being 20 milliseconds long would now be only about 0.16 millisecond long. The problem of adding pulses of as short duration as this in order to decode the secret speech at the receiver has been thought to present considerable difficulty.

In accordance with this invention the combining of short impulses in proper phase relation is accomplished by, in effect, converting each short impulse as received into a long flat-topped impulse which is held in one of a number of branch circuits until the locally produced pulse is ready for combination with it. A number of such received pulses can be stored at the same time in a number of such branch circuits and the locally produced pulses are distributed over these branch circuits in such manner as to combine each locally produced pulse with the proper one of the received stored pulses. The tolerance as to time in which the locally produced pulses are to occur for proper combination with the received pulses is multiplied by a number corresponding to the number of such branch circuits (or the number of simultaneously stored pulses) and may, for example, be tenfold as will be assumed in the specific illustrative disclosure to follow, this value to be taken as illustrative rather than limiting.

In the disclosure herein the received signal waves or pulses are distributed to the plurality of circuit branches where they are separately stored, under control of a special or pilot current that is sent along with the signal from the transmitter. This current may have a relatively low frequency by way of example. Similarly, the key wave that is produced at the receiver is accompanied by pilot currents or pulses bearing definite time relation to the key wave, and the key waves are distributed over these same circuit branches so that each key pulse is combined with its proper signal pulse and both flow together into the circuit in which they are to be used.

More specifically stated, each pilot pulse received from the transmitter generates a series of pulses in timed relation which successively unblock a series of storage devices at the right times to allow the individual signal pulses received over the given small period between pilot pulses to pass selectively and separately into these storage devices. At some time later, the locally produced pilot pulse serves to unblock the output ends of these storage devices in succession to allow the stored pulses to be applied one after another to the utilization circuit and at these same instants the local key pulses are applied in succession to the utilization circuit to combine with the pulses that have been held in storage. The synchronism requirements are relaxed to the considerable extent that the unblocking times controlled by the local pilot pulse can vary from a time immediately following the admission of the signal pulse to a storage device until a time immediately before the storage device is to receive its next signal pulse, which in the specific example under consideration would be the tenth subsequent signal pulse in each case.

Referring to FIG. 1, which shows the apparatus at a transmitting station, various samplings are carried out in timed relation under control of a wave which is assumed to be recorded on the record 20 along with the recorded key waves as will be described at a later point. (This record and also the duplicate record at the distant station are each assumed to be driven at highly constant speed from independent standard frequency sources such as highly stable crystal oscillators, not shown.) It will be assumed for convenience of description that this recorded control wave is a 600-cycle sine wave, although, of course, there is nothing limiting in this numeral magnitude. This control wave is for the purpose of synchronizing the two ends of the system and will be referred to at times as the synchronizing wave. It is selected by synchronizing filter 21 and a portion of it is sent directly to the outgoing line or channel 75 through circuit branch 22. Some of this wave is also impressed on harmonic generator 23 the output of which leads to two impulsers, one the sampler impulser and the other the reentry impulser. The frequency multiplication in the harmonic generator 23 may be, by way of example, tenfold so that the wave impressed on the impulsers mentioned has a frequency of 6,000 cycles.

Referring first to the sampler impulser, this comprises an impulse coil or "kick" coil 25 cooperating with condenser 26, rectifiers 28 and automatic bias circuits 27 to generate short sharp peaked pulses alternating in polarity, those of the same polarity occuring at a 6,000-cycle rate as indicated in the first graph of FIG. 3, speech sampling pulses. The coil 25 preferably has an easily saturable core, such as permalloy, and operates in the general manner described in Wrathall U.S. Pat. No. 2,117,752, issued May 17, 1938, to produce a sharp pulse at a definite point in the cycle of the impressed wave, such as near the zero cross-over point. The automatic bias circuits 27 each comprise a parallel condenser 29 and resistance 30 which are in series with the rectifier 28. Due to rectification each of these circuits builds up a counter-voltage on the condenser of such value that only the tips of the waves are shunted out and the remaining portions get through to the outgoing circuit. This results in the development of very short square-topped pulses.

The output of the sampler impulser is divided by rectifiers 33 and 34 into two portions, the impulses of one polarity passing through rectifier 34 into circuit 35 leading to the speech sampler 36 and the other portion passing through rectifier 33 into branch 37 leading to the output sampler 38. It will thus be seen that the pulses which control the speech sampler are displaced by half the cycle of the 6,000-cycle wave from those pulses which control the output sampler as may be seen by comparing the corresponding graphs of FIG. 3.

The key wave recorded on record 20 is taken off through key filter 40 and, since this is recorded as will be described later in the form of a modulated high frequency wave, it is rectified at 41 to obtain a key current in the form of a direct current representing a series of unidirectional pulses occurring at 6,000 cycles per second. These are passed through low-pass filter 42 and impressed on the key sampler 43. A portion of the output of the sampler impulser passed through the rectifier 34 is supplied over circuit 48 to this key sampler.

The speech sampler, key sampler and output sampler all operate in the following way, referring specifically to the key sampler 43. The objects of the samplers is to place on condenser 44 during a brief interval a charge corresponding to the input voltage appearing across input resistance 45 in such brief interval and to hold the charge constant until the next exposure time, in this case 0.16 milliseconds later. This is accomplished by means of the bridge 46 consisting of two resistance arms and two unilateral devices 47, which may be diodes as shown in this case or solid element rectifiers as indicated in certain of the other bridges by way of illustration. In the absence of a voltage in the control circuit branch 48, the bridge 46 is balanced and offers practically infinite impedance in the series circuit connecting input resistance 45 and condenser 44. When an impulse is transmitted through circuit branch 48 to the bridge 46 to render the valves 47 conducting, the resistance offered by the bridge 46 in the series path between 45 and 44 falls to a very low value. Moreover, this path through the bridge conducts equally well in both directions because of the use of oppositely directed valves 47. Thus, if the voltage appearing across resistance 45 is greater than the voltage existing across condenser 44, the condenser quickly receives more changing current, raising its terminal voltage to substantially equal that across resistance 45. If the voltage existing across condenser 44 is already higher than that existing across resistance 45, discharge current will flow from the condenser back through the bridge 46 and be dissipated in resistance 45 until the voltages are again substantially equal across condenser 44 and resistance 45, respectively. The exposure time is just sufficient to enable the desired amount of change to take place in the condenser charge. At the termination of the exposure pulse the condenser retains its charge substantially constant until the next exposure time. Grid leak resistor 49 is so high as not to discharge condenser 44 appreciably during the intervening time and may be omitted entirely in some cases. The voltage across the condenser is applied to the grip of an amplifier tube 50 and the amplified voltage is taken off from across cathode resistor 51 and applied to the input resistor 56 of the reentry circuit 52 for combining with the sampled speech waves. The character of the key wave in the output of tube 50 in the branch circuit K is shown in FIG. 3 and consists of flat-topped pulses each of 0.16 millisecond duration.

The speech waves originating in microphone 53 are applied to the speech sampler 36 and are sampled at the same instants in which the key waves are sampled to produce in the output of amplifier 55 at point M a series of flat-topped pulses each having a duration of 0.16 milliseconds and having amplitudes corresponding to the instantaneous amplitude of speech waves at the instant of sampling. These flat-topped pulses at M representing speech are added to the key pulses at K and both of them together are impressed on the input of the reentry circuit 52 across input resistance 56.

The action of the reentry circuit can be described more readily by assuming certain illustrative magnitudes of message and key currents. If the total range of the message currents is from nought to five arbitrary units and the range of the key waves is the same, the maximum current obtained by direct addition will be ten units and the minimum will be zero units. In order to avoid the possible clue that might be furnished by these limiting values, if all values of the combined message and key currents were transmitted, the reentry principle is used. Accordingly, whenever the summation of the message and key currents exceeds the value five units, a subtraction of five units is made and the difference current is transmitted. If the summation current, for example, is six units, a current of one unit amplitude is transmitted and so on. The total amplitude range of the transmitted current is, therefore, no greater than five units in the example assumed. It is found that if the range of the key currents is at least as great as the range of the message currents (and the range of the key currents may, in fact, be greater than the range of the message currents) and if the key currents have random variation, the transmitted currents are also random and contain no clue to the message.

The reentry circuit 52 is constructed to have a marginal type of operation, such as to subtract a definite voltage from the outgoing wave whenever the input voltage exceeds a certain amount. The reentry circuit comprises a gas tube 57 having a suitable negative bias applied to its grid from across potentiometer 58 connected across bias battery 59. The input voltage across resistor 56 is applied to the grid and whenever the input voltage exceeds by a sufficient amount the negative bias applied to the grid, the tube breaks down and transmits current from its plate through limiting resistor 60, coil 61 and load resistor 62 to its cathode. The anode voltage for permitting discharge is in the form of a pulse received over circuit branch 63 from the reentry impulser 64. The shape of these pulses is indicated by the corresponding graph of FIG. 3 and is such that current is transmitted for about 0.08 millisecond in the middle of the applied impulses from the speech and key samplers. The input voltage occurring across resistor 56 is transmitted through series resistor 66 to the outer terminals of the resistances 65 and 62. The discharge current from the tube 57 flowing through resistor 62 as described has such polarity as to subtract a definite voltage from the wave which is received across resistors 65, 62 from the input. If, for example, the input voltage across resistor 56 were eight units, tube 57 would break down and subtract five units, leaving a voltage of three units across the line at the point where resistances 65 and 62 are connected.

Referring again to the reentry pulses obtained from reentry impulser 64, these are produced by taking some of the 6,000-cycle waves from harmonic generator 23 and applying them through retardation coil 68 to shift their phase by approximately 90°, after which they are impressed on the self-biasing rectifiers 69. These are adjusted to allow the positive half cycles of the 6,000-cycle wave to be shunted for one-half the time and also to allow the negative half cycles to be shunted for one-half the time. The waves which pass into the circuit 63 are, therefore, portions of the 6,000-cycle wave near its zero axis, the higher amplitude portions having been removed. By making the applied wave of sufficiently high amplitude, substantially square pulses can be obtained. It will be noted that these pulses are longer than those produced in the sampler impulser.

Referring to the output sampler 38, the voltage existing across the resistors 65 and 62 have no affect on the voltage across condenser 70 of the sampler except at the instants when the sampler pulses are applied over circuit 37 to reduce the resistance of the sampler bridge 71 to a low value. These pulses occur at the middle point of the message pulses, which is also the middle point of the key pulses and of the reentry pulses as indicated by the graphs of FIG. 3. Thus the voltage across condenser 70 is made to represent the voltage across resistors 65 and 62 after reentry has been accomplished, if reentry is to take place in a given instant. The voltage on condenser 70 is amplified by tube 72 and the voltage load resistor 73 is applied to the outgoing line through amplifier 74.

The lowermost graph of FIG. 3 indicates by way of example what the output current of the line may be. The first pulses shown assume that reentry did not take place. The fourth pulse assumes that the addition of the message and key waves, as shown by the dotted line, resulted in a sufficiently high summation voltage to cause reentry, and the resultant current transmitted is shown by the solid line.

Referring to FIG. 2, which shows the receiving terminal, filter 80 selects the 600-cycle synchronizing current and applies it to a number of gate impulsers, for example, five as indicated. This wave is applied to gate impulser No. 1 without any phase shift, is applied to impulser No. 2 with a 36° phase shift, and is applied to each of the other impulsers with a correspondingly greater phase shift. Each of these gate impulsers is similar to the sampler impulser described in connection with FIG. 1 and generates short sharp pulses alternating in polarity with the pulses of one sign occurring at 6,000 cycles per second. As shown in the case of gate impulser No. 1, there are two outputs for each impulser leading to respectively oppositely poled rectifiers to separate the two polarities of pulses. These ten pulses per cycle of the 600-cycle control wave are displaced on the time scale as represented on FIG. 4 at P1 and P10.

These pulses are applied respectively to ten input gates each including a bridge of the type used in the samplers of FIG. 1 comprising two resistance arms and two oppositely poled rectifiers, such as diodes or solid element rectifiers. For simplicity of the drawing, only three of these input gates are shown numbered 1, 2 and 10. The impulses from gate impulser 1 are supplied through one branch to the bridge of input gate No. 1 and through another branch to the bridge of input gate No. 6 a cross-over being made in the leads of one of the two branches to supply the pulses to the different gates in the same polarity.

The coded signal impulses received over the line 75 are impressed across input resistor 85 across which are connected all of the input gates 1 to 10. Since the pulses of the keyed message wave occur at a 6,000-cycle rate, while the synchronizing current has a frequency of 600 cycles, there are ten of the message pulses per cycle of the synchronizing wave. The ten short sharp pulses generated in the gate impulsers 1 to 5 are, on account of the phase shifts introduced into the synchronizing wave, distributed over one complete period of the 600-cycle synchronizing wave in such manner as to coincide respectively with the central portion of the ten coded message pulses received during this period. The pulse applied to input gate bridge No. 1, therefore, allows the first of the keyed message pulses to pass through and charge condenser 86 to a voltage proportional to the amplitude of the first received keyed message wave pulse. The short sharp pulse from gate impulser No. 2 is applied to the bridge of the second input gate at the right instant to permit the sampling of the second received keyed message pulse at its middle portion and place a corresponding charge on condenser 87. In similar manner, each of these ten successively received keyed message pulses under consideration is sampled by the ten input gates and corresponding charges are placed on the storage condensers 86, 87, etc. It is assumed in this discussion that the transmission channel 75, whether it be a channel on a transmission line or other guide or radio channel is such as to permit the keyed message waves and the 600-cycle synchronizing wave to maintain the same phase relations with which they started out from the transmitter so that they arrive in fixed phase relation at the receiver. As long as this is the case or approximately so, the sampling of the received keyed message waves can take place as described.

Each of the ten input gates is associated with a corresponding output gate including bridges A to J which are caused to sample the voltage stored on the condensers 86, 87, etc. under control of the 600-cycle wave recorded on record 90, which is assumed to be in all respects a duplicate of record 20. The synchronizing wave from record 90 is selected by filter 91 and applied to five gate impulsers A to E, inclusive, which are duplicates of gate impulsers No. 1 to No. 5, inclusive. Also, phase shifters are used for impulsers B to E, which are identical with those used in the case of impulsers No. 2 to No. 5. As a result, ten pulses are produced occurring at a 6,000-cycle rate in each period of the 600-cycle control wave from record 90 and the bridges A, B to J are rendered conducting in successive instants of time corresponding to these pulses. A larger amplitude of 600-cycle wave is impressed on the gate impulsers A, B to E than is impressed on the gate impulsers No. 1 to No. 5 and the automatic biasing shunts are adjusted to give a broader impulse to the output gate bridges A, B to J as is indicated in the graphs of FIG. 4 where these impulses are designated PA, PB, etc.

The use of the input gates and output gates for the storing of condensers between them facilitates the synchronizing problem. It is assumed that the record 90 is driven from a constant frequency oscillator, (not shown), such as a crystal controlled oscillator of great constancy of frequency, the output of which may be suitably amplified and used to drive a synchronous turntable motor. It is assumed that the apparatus at different stations is similarly governed from a constant frequency source at each station. It is further assumed that in the station of FIG. 2 the frequency and phase of the source driving the record 90 has been adjusted so that the pulses applied to the output gate A, for example, normally occur mid-way between the pulses applied to the input gate No. 1 and the same relation holds in each of the other nine channels. The only requirement as to synchronism is that the gate A be opened in time to pass on to the reentry circuit 95 the particular voltage existing across condenser 86. This can happen if the gate A is opened at any time after the charging of condenser 86 by an incoming signal pulse and before the condenser 86 is recharged to a different value by the next signal pulse which passes through input gate No. 1, which in the present instance would be the tenth succeeding line impulse. The requirement as to synchronism between the two records is, therefore, reduced tenfold in the specific example given as compared with the requirement that would exist if there were no storage of the incoming pulses at the receiver.

As the output gates A to J are opened in succession the stored pulses from the condensers 86, 87, etc. are allowed to pass in succession to the input of the reentry circuit 95 where they are combined with key pulses received from the key sampler 100. The key on the record 90 is taken off through key filter 101, rectified at 102 to obtain a direct current wave of varying amplitude and passed through low-pass filter 103 to the key sampler 100 which receives sampler impulses from sampler impulser 93 operated from harmonic generator 92 under control of the 600-cycle wave on record 90. This key sampler 100 operates in the same manner as the key sampler 43 at the transmitting station and applies the key pulses to the reentry circuit 95 along with the pulses which pass through the output gates A to J. Since the 600-cycle synchronizing wave is recorded on record 90 together with the key wave, these two waves are in fixed phase relation with respect to each other which insures that the key pulses are applied to the reentry 95 at the same instants of time as the pulses which pass through the output gates. Sampler impluser 93 has a divided output 98, 99 for supplying opposite polarity pulses to key sampler 100 as described and to output sampler 110.

The reentry receives its impulses from reentry impulser 104 which is a duplicate of reentry impulser 64 at the transmitter station. The purpose of this reentry is to perform the reverse of the reentry step introduced at the transmitter. If the message impressed on the transmitting reentry circuit is M and the key is K, then, S, the line signal can be represented at the times when reentry has taken place as $S = M + K - 5$. The message can be recovered by any one of a number of types of reentry but one of the simplest ways is to recover the message as a negative current pulse where it originated as a positive pulse, so that the relation $-M = K - S - 5$ can be used. For speech it makes no differenece that the sign of M has become reversed. If for some type of signal this inversion does become significant, a reinversion can readily be made as by using known type of vacuum tube amplifier to shift the phase by 180°. In the last equation, the message is recovered by using the same type of reentry circuit as that used at the transmitter but adjusting it to substract five units whenever K > S. This can be done by applying K to the reentry in its normal polarity but reversing the polarity of S, and adjusting the bias on tube 130 so that the tube fires whenever a positive voltage is impressed across resistor 131, that is, whenever the upper terminal of resistor 131 is positive. The reversal of S is accomplished by coupling to the plate instead of the cathode of each of the tubes 136, 137, etc. in the distributor storage circuits, as by coupling to resistors 139, 140, etc. in the anode branches instead of to resistors (such as resistor 73 of FIG. 1) in the cathode branches. The bias battery 143 and potentiometer setting of 142 for tube 130 are made such that the tube is biased toward firing and fires when the grid is driven further in the positive direction by the incoming signal and key pulses.

The output key sampler 110 operates in the same manner as does sampler 38 at the transmitting station to produce across condenser 111 pulses of the form shown at M in FIG. 3 consisting of flat-topped pulses varying in amplitude from pulse to pulse at a 6-kilocycle rate representing understandable speech, except that with the type of reentry described these pulses are recovered inverted in sign. These pulses are sent through the amplifier tube 112 and impressed upon the receiver 113. By coupling to the anode resistor 150 instead of to a cathode resistor (similar to 73 of FIG. 1) these pulses are reinverted before applying them to receiver 113.

It will be apparent that amplifiers may advantageously be used at various points throughout the system and no attempt has been made to show such points to avoid needless complication of the drawing since it will be obvious to insert amplifiers wherever they may be needed.

As noted above, the records 90 and 20 are exact duplicates of each other and are either cut simultaneously from the same recording circuit or are pressed from a common master record. One circuit for building up the key wave and insuring proper relationship between the key wave and the 600-cycle synchronizing wave is illustrated in block schematic form in FIG. 5. The key is obtained by sampling the random noise currents produced in a random noise generator 120, such as is obtained from amplified resistance noise, gas tube noise, etc., the output of which is a continuous spectrum type. The sampling circuit 121 for this noise may be of the same type as the key sampler 43, for example, and the sampler impulser 122 may be the same as the sampler impulsers of FIG. 1. In this case a 600-cycle oscillator 123 is applied to generator 124 and the tenth harmonic, 6,000 cycles, is passed through filter 124 to the input of the sampler impulser 122 to cause the latter to apply sampling pulses at a 6,000-cycle rate to the sampling circuit 121. The noise wave is sampled 6,000 times a second, resulting in a wave of the type shown at N in FIG. 6 consisting of flat-topped pulses each of a 0.16 millisecond duration. This wave is definitely tied to the 600-cycle wave S. W. of FIG. 6 since the sampling pulses are derived from the 600-cycle source 123. The wave then is passed through low-pass filter 125 havin a cut-off frequency of 3,000 cycles and is impressed on modulator 126. The filter 125 rounds off the pulses to the form shown by curve N' of FIG. 6. The modulator 126 is supplied with a 6,000 carrier wave from filter 124 and the output modulated wave is applied to the record cutter together with some of the 600-cycle wave of oscillator 123. The appearance of the key wave as actually recorded is, therefore, a modulated wave whose envelope varies in accordance with N', this type of wave being indicated as N'' in FIG. 6.

The invention is not to be construed as limited to the specific circuits disclosed nor to the numerical values or magnitudes given by way of illustrative example, but the scope is defined in the claims which follow.

What is claimed is:

1. In combination, means for receiving a signal wave accompanied by a pilot impulse, means to combine with the received signal wave a locally produced wave in predetermined phase relation comprising means to produce a local pilot impulse in definite relation to said locally produced wave, signal storage means, means responsive to said first pilot impulse to enable said storage means to receive and store said signal wave, a signal responsive device, and means controlled by said local impulse to impress said stored signal wave upon said signal responsive device together with said locally produced wave.

2.In combination, a source of electrial waves, a source of local waves to be combined with said electrical waves in definite phase relation, a load circuit for the combined waves, a plurality of electrical storage circuits, means for dividing the electrical waves into short fragments and means to distribute said fragments one at a time to respective individual storage circuits, means to recover said fragments from said storage circuits individually and in proper phase to combine with said local waves, and means to impress said recovered and local waves in said definite phase relation on said load circuit.

3. In combination, a source of electrical pulses of varying amplitude, a local source of pulses of varying amplitude to be combined with said electrical pulses individually, a load circuit for the combined pulses, a plurality of electrical storage circuits, means to distribute said electrical pulses one at a time to respective individual storage circuits, means to recover the stored pulses from said storage circuits individually in proper timed relation to combine with the respective local pulses, and means to impress said recovered and local pulses together on said load circuit.

4. In combination, a receiving circuit for pulses of varying amplitude representing a coded signal, a local source of key pulses to be combined with said coded pulses to decode the signal, a plurality of electrical storage circuits, means to distribute the received pulses individually to respective storage circuits, means to recover the stored pulses individually in proper timed relation to coincide with the key pulses with which they are to be combined, and means to combine each recovered pulse with its proper key pulse.

5. In a receiving circuit for pulses of varying amplitude representing a coded signal, means to receive a timing wave, a plurality of pulse storage elements, distributor means controlled by said timing wave for distributing each successively received pulse to a different one of said storage elements, a local source of key pulses to be combined individually with the received pulses to decode the signal, a local source of timing pulses, and distributor means controlled by said timing pulses for recovering the stored pulses from said storage elements one at a time in proper timed relation to coincide in time each with the local key pulse with which it is to be combined.

6. In a system of distribution of pulses of varying characteristic and timing waves, a source of other pulses and timing waves local to a station, a succession of pulse storage elements at said station, means under control of said first-mentioned timing waves for directing each of said first-mentioned pulses into a different one of said storage elements, means under control of said local timing waves to recover the stored pulses from said respective elements individually and in given order, and means for combining each recovered pulse with the other mentioned pulses in respective time coincidence.

7. In a receiving circuit, a signal storing distributor having a plurality of input gates and a corresponding plurality of output gates with a corresponding plurality of signal storage elements, a common output circuit, means for receiving signal currents and control currents, means under control of the control currents to open said input gates in timed sequence and to close each input gate before the next one is opened, each input gate when open allowing the signal to pass to the corresponding storage element, means producing key currents and local control currents, means under control of said local control currents to open said output gates in time sequence and to close each output gate before the next one is opened, each output gate when open allowing the signal stored on the corresponding storage element to pass into said common output circuit, and means to impress said key currents upon said common output circuit in synchronism with the opening of the respective output gates.

8. In a speech transmission system, means to sample input speech waves twice per cycle of the highest component frequency of the speech to be sent, means to produce pulses representative of the sampled speech equal in length to the time between sampling instants, means to combine said pulses with individual key pulses to disguise the speech pulses and means to transmit the combined pulses.

9. A system according to claim 8 including after said combining means a reentry means for subtracting a constant pulse amplitude from the combined pulse whenever the latter exceeds a given maximum value.

10. In combination, a grid controlled vacuum tube, a condenser across the grid-cathode terminals, a source of signal waves to be sampled, means including a bidirectionally conducting gating circuit connecting said source to said grid-cathode circuit, an outgoing circuit conductively connected to the output of said vacuum tube, means to apply sampler pulses to said gating circuit at a rate high enough to sample the highest signal frequency, each sampler pulse being short in comparison to the time elapsing between successive sampler pulses, a second gating circuit connected in said outgoing circuit, and means to apply sampler pulses to said second gating circuit displaced in time with reference to the aforementioned sampler pulses.

11. In a signaling system, a source of signal waves, means to sample said signal waves periodically to obtain pulses having amplitudes indicative of the signal amplitudes at the instants of sampling, means to store said pulses in individual circuits for a time duration embracing several sampling periods to produce pulses many times longer than the sampling instants and overlapping in time the stored pulses in others of said circuits, and individual transmission means for the pulses stored in the several circuits.

12. In secret signaling, means at a transmitter to combine signal currents with secret key currents to form combined pulses succeeding each other in time, means at a receiver to recover the signals by combination of the received pulses with duplicate key currents in proper time relation, and means to ease the timing requirements comprising a plurality of storage circuits, means to distribute each of a series of said successive pulses to a different one of said storage circuits to provide in each circuit a prolonged pulse several times longer than the pulses comprised in said series, and means at the receiver to sample said prolonged pulses and to combine them with the duplicate key currents.

13. In secret signaling in which duplicate key currents are supplied at transmitting and receiving points together with means at the transmitter to combine the key currents thereat with the signal currents before transmission and means at the receiver for combining the key currents thereat with the received combined currents to enable recovery of the signal currents, means operating in the combining process at the transmitter to form the combination signal and key currents into pulses succeeding one another in time, and means to facilitate proper combination of the key currents at the receiver with the received combined currents comprising at one of said two points a succession of pulse storage circuits and means to distribute series of said pulses cyclically over said storage circuits to cause successive pulses to be stored in respective individual circuits to provide much longer pulses and means at the receiving point for combining the key currents thereat with pulses derived from said longer pulses.

14. A secret transmission system for signals of speech frequency comprising means to sample said signals at 2N times per second where N is the highest important signal frequency and is of the order of 3 kilocycles per second, means at a transmitting point to combine a separate secret key pulse with each sampled portion of the signal, means to subtract from the combined pulse a fixed pulse amplitude whenever the combined pulse exceeds a predeteremined maximum amplitude to provide secret pulses for transmission, and means to transmit the resultant pulses.

15. A system according to claim 14 comprising at a receiving point a source of duplicate secret key currents, means to combine secret key currents from said source with the received secret pulses to recover the signal, and means at one of said two points to store successive pulses in respective circuits to increase their duration several fold to facilitate proper combination therewith of the secret key currents from said source.

16. A speech transmission system comprising a source of speech-bearing input waves, means to derive from said waves within brief sampling periods discrete samples of speech, said samples occurring at a rate substantially twice the highest essential speech frequency, an array of storage circuits, distributor means for impressing successively derived speech samples in rotation upon said several storage circuits, said storage circuits having means to prolong the respective impressed speech samples throughout an interval many times longer than the duration of the speech sampling period, and individual transmission means for the several storage circuits for transmitting the pulses stored therein.

* * * * *